(No Model.) 3 Sheets—Sheet 1.

T.-McMAHON.
MACHINE FOR MAKING WIRE NAILS.

No. 372,320. Patented Nov. 1, 1887.

Witnesses. Inventor.

(No Model.) 3 Sheets—Sheet 2.
T. McMAHON.
MACHINE FOR MAKING WIRE NAILS.
No. 372,320. Patented Nov. 1, 1887.
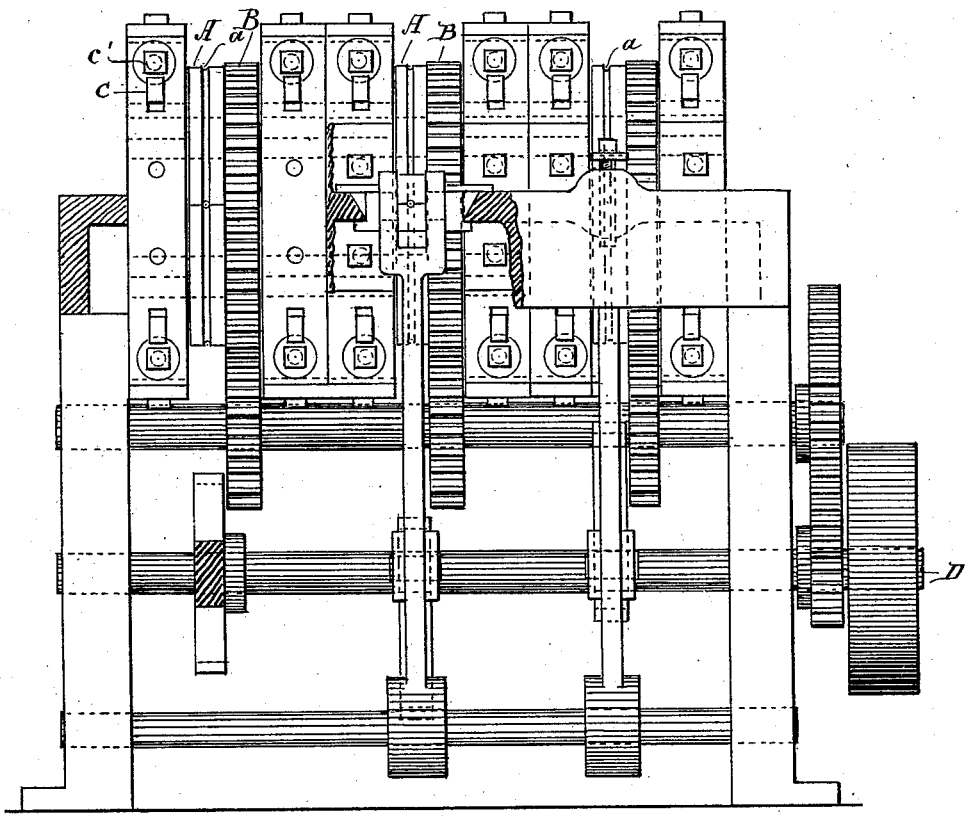
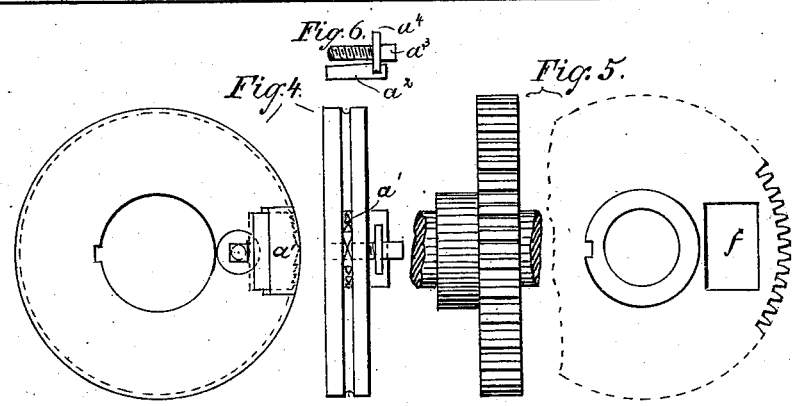
Witnesses.
Inventor.
Thomas McMahon (No Model.)  3 Sheets—Sheet 3.

T. McMAHON.
MACHINE FOR MAKING WIRE NAILS.

No. 372,320.  Patented Nov. 1, 1887.

Witnesses.
Chas. B. Bulf
Robert Bartlett

Inventor.
Thomas McMahon

UNITED STATES PATENT OFFICE.

THOMAS McMAHON, OF BROOKLYN, NEW YORK.

MACHINE FOR MAKING WIRE NAILS.

SPECIFICATION forming part of Letters Patent No. 372,320, dated November 1, 1887.

Application filed November 18, 1886. Serial No. 219,272. (No model.)

*To all whom it may concern:*

Be it known that I, THOMAS McMAHON, a citizen of the United States, residing at Brooklyn, in the county of Kings and State of New York, have invented certain new and Improved Machines for Making Nails, &c., of which the following is a description in such full, clear, and exact terms as to enable any one skilled in the art to which my invention relates to make and use the same, reference being had to the accompanying drawings, making part of this specification, and to the letters and figures of reference marked thereon, in which—

Figure 1:
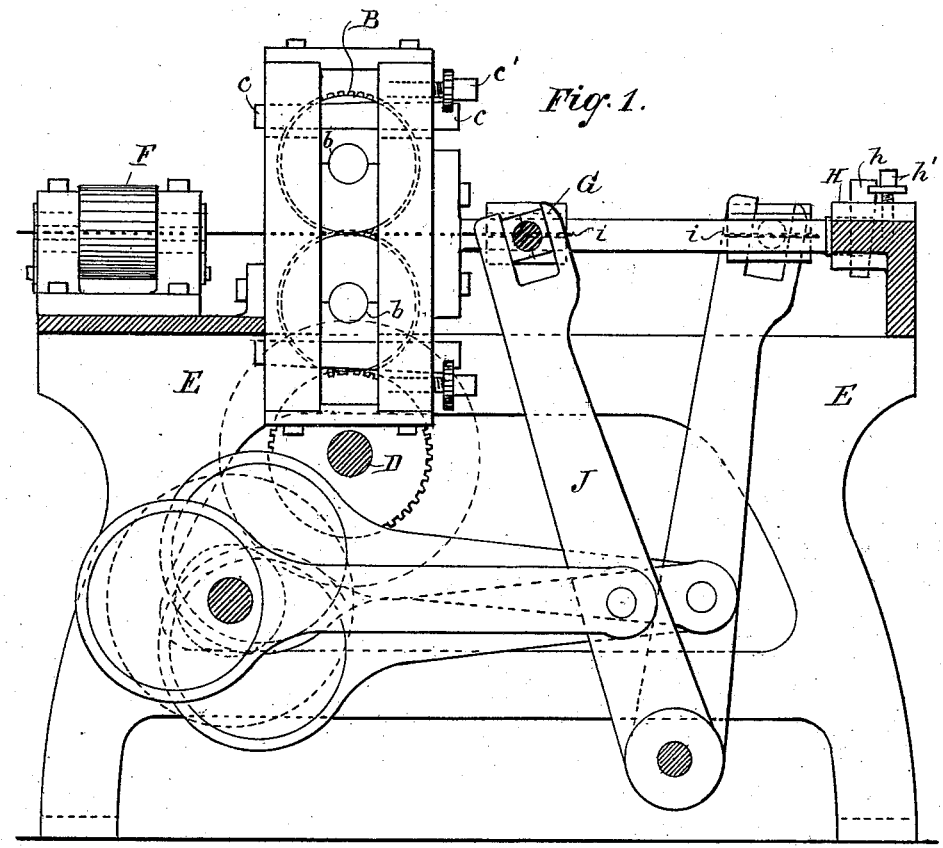
Figure 2:
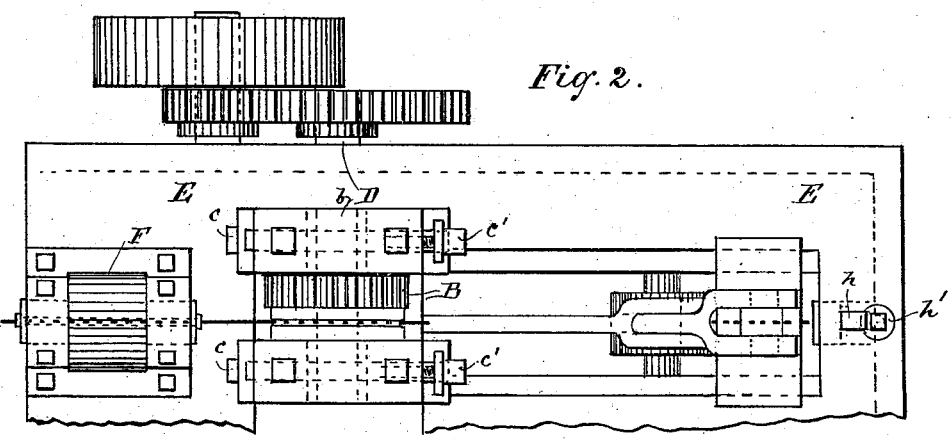

Figure 1 is a side elevation of my improved machine; Fig. 2, a top view of a part of the same; Fig. 3, an end view, and Figs. 4, 5, 6, 7, 8, 9, and 10 detail parts, of the machine.

Similar letters of reference indicate corresponding parts in all the figures of drawings.

My invention relates to machines for making nails, button-shanks, staples, and articles similarly formed from wire; and it consists of various devices and combinations of devices for effecting the result to be attained rapidly, uniformly, and by simple contrivances.

Referring to Fig. 3, A are forming rolls or wheels set in pairs one above the other, each having its periphery cut with a semicircular groove, $a$, for the purpose of guiding the wire from which the nails or other articles are to be formed as it is carried forward by the revolution of said wheels. Said grooves also act to prevent the wire from spreading while it is being separated and shaped under the action of the dies carried by said rolls. Each of these rolls A is provided on its periphery in the line of said grooves $a$ with severing, pointing, and shaping dies $a'$. (See Fig. 4, consisting of two views—to wit, a side and a front view—of the rolls A on enlarged scale.) These dies are placed at proper distances apart to sever, point, and shape the wire in the desired lengths and forms of the nails or other articles manufactured, and both the upper and lower rolls are provided with dies $a'$ so adjusted as to fashion by their joint operation the wire to the desired shape before it is passed onto the finishing-dies. These dies (shown in Fig. 4) are designed to sever and point the wire and form barbs or indentations on its side; but any other forms of dies may be substituted for those here illustrated. I prefer to fashion these dies so as to draw the wire as a blacksmith draws a bar upon the anvil, thereby economizing material by preventing waste from fins or chips, such as are cut off in the ordinary processes. These dies $a'$, set upon the periphery of the rolls A, are provided with means for adjusting their position—such means, for example, as are illustrated in Figs. 4 and 6, and which consist of a set-screw, $a^3$, set in the side of the roll A to operate the key, having a flange, $a^4$, fitting in a slot in a wedge or key, $a^2$, free to move longitudinally and operating against the die $a'$ to regulate its position. The wedges or keys $a^2$ are fitted in the rolls A to form a perfectly solid and unyielding backing or support for the adjustable dies $a'$, and at the same time to enable the operator to adjust the dies in any position with ease and accuracy.

Figure 8:
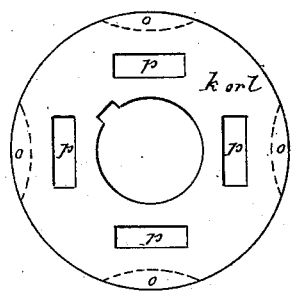
Figure 7:
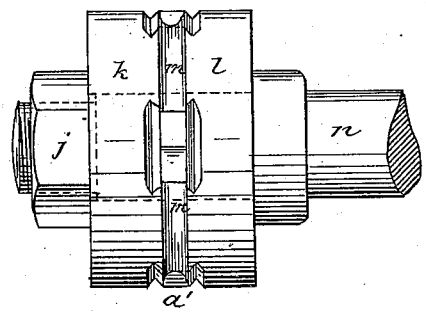
Figure 9:
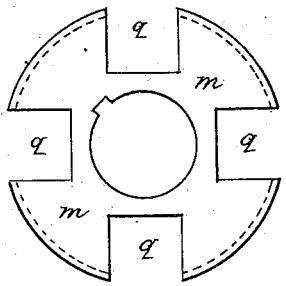
Figure 10:

Figs. 7, 8, and 9 illustrate the forms in which I prefer to make the forming-rolls. By reference to said figures it will be seen that said forming-rolls are made of three separate disks clamped together on the driving-shaft or gear-hub by a nut, $j$, of large diameter. The two outside disks, $k$ and $l$, are plain on their periphery, except those parts which are opposite the dies for fashioning and severing the wire carried on the central disk, $m$. At those points said outside disks have grooves $o$ cut in their periphery, forming a sharp edge nearest the central disk for the purpose of cutting off any thin fin that may be formed on the nail in the operation of forming the point thereon and severing it from the wire. The forming-rolls $k$ $m$ $l$ may be located upon the end of the shaft outside of the housings when used for making articles from the smaller sizes of wire, as in that position they are more easily changed and adjusted. These disks are keyed together by means of wedge-pieces passing through the holes $p$ in the disks $k$ and $l$ and the bottom of the hole $q$ in the disk $m$. The cutting-dies are set in said hole $q$ on top of said wedge-pieces.

The cutters for severing the wire may be so adjusted that they will not quite sever the wire as it passes through them, but will permit it to be fed forward for the purpose of acting upon the blanks by bending or other desired operations while the blanks are yet connected together.

The rolls A are keyed or otherwise secured to gears B. The metal forming the gear-wheel B is cut away to accommodate the wedge $a^2$ and screw $a^3$, which projects through it. (See Fig. 5.) These gear-wheels are connected in train with the main driving-shaft D, whereby the rolls A are rotated. The gear-wheels B are journaled in separate journal-boxes $b$, set in housing-frames. The said journal-boxes are adjustable in the said housing-frames, and their position is regulated by means of a wedge or key, $c$, operated by a set-screw, $c'$, in substantially the same manner and by similar devices as those heretofore described as adapted to regulate the adjustment of the dies $a'$. A means is thus provided for regulating the adjustment of the journal-boxes $b$ in position to accommodate different sizes of rolls and gear for various work, and also to permit of several gangs of rolls being driven from one driving-shaft, although the several gangs may be employed, making nails of different size and pattern or various articles of manufacture.

E is a frame or bed upon which the gears, rolls, and other devices are carried. On said frame, in front of each pair of rolls, a wire-straightener, F, is seated, which may be of any known and desired form and construction, to straighten the wire before it is delivered to the action of the rolls A and their attendant dies.

G are gripping-dies of ordinary construction, arranged to open when near the rolls to receive the pointed blank $i$ and to close and firmly clasp the blank as they move forward toward the heading-die H, which is also attached to the frame E, and against which the end of the blank to be headed is driven by the forward movement of one of the arms J, carrying the grippers G, which arms J, by means of gear and cam or other suitable device, are vibrated to and fro between the rolls A and the heading-die H to receive the pointed blanks as they are discharged from the rolls and drive them against the heading-dies H, after which they are dropped into a suitable receptacle placed below the machine to receive them. The heading-die H is provided with a key or wedge, $h$, operated by a set-screw, $h'$, to adjust the position of said die, substantially as hereinbefore described in relation to the adjustment of the dies $a'$, carried by the rolls A.

The operation of the machine is as follows: The wire to be worked is passed through the straightener F and delivered between a pair of rollers, A. Power being applied to the main driving shaft D, the gears B, to which the rolls A are attached, are revolved by intermediate gearing, and the wire being caught and drawn forward is pointed, shaped, and separated by the dies $a'$, suitably designed and adjusted for that purpose. The pointed blank as it leaves the rolls is caught and held by the grippers G, carried by the arm J, and operated by the power transmitted from said main driving-shaft, and is carried forward and forcibly against the heading-die H, after which the gripper opens, drops the finished nail, and returns to receive another blank.

When making wire staples, I prefer to point the wire at both ends of the blank, the wire being subsequently bent into the U form after it has been pointed. When making nails, however, I prefer to use dies which point the blanks only on one end. The dies illustrated in the drawings are adapted to point the wire on both ends.

In the drawings three pairs of rolls and their attendant parts are illustrated, which pairs are duplicates of each other, all operated by the same power transmitted from the same driving-shaft, but yet operated independently, and each provided with means of adjustment, as hereinbefore described, so that each independently is adapted to manufacture and may be engaged in manufacturing nails or other articles of the desired shape and size without regard to the work being performed by the others.

Having thus described my invention, what I claim, and desire to secure by Letters Patent, is—

1. In a machine for making nails, a forming-roll having a groove to prevent the wire spreading, dies for forming the point on said wire, and dies for cutting off the fin formed thereon, substantially as described.

2. In a machine for making nails, a forming-roll consisting of the combination of a central disk and two outer disks keyed together, said central disk being provided with a forming-die and a groove for the purpose of preventing the wire spreading, and said outer disks being fashioned into cutting-dies, substantially as described.

3. In a machine for making nails, and combined with a die for forming the point thereon, a wedge and means for varying the position of said wedge to effect the adjustment of said die, substantially as described.

4. In a machine for making nails, a forming-roll consisting of the combination of a central and two outer disks keyed together, said central disk being provided with a forming-die and said outer disks being fashioned into cutting-dies at the sides of said forming-die, substantially as described.

5. In a machine for making nails, a forming-roll consisting of the combination of a plurality of disks keyed together, said central disk being provided with a die for shaping the blank and said outer disks with dies for cutting off the fin formed thereon, substantially as described.

THOMAS McMAHON.

Witnesses:
J. EDGAR BULL,
ROBERT BARTLETT.